(12) United States Patent
Saha et al.

(10) Patent No.: US 11,768,860 B2
(45) Date of Patent: Sep. 26, 2023

(54) BUCKETING RECORDS USING TEMPORAL POINT PROCESSES

(71) Applicant: International Business Machines Corporation, Armonk, NY (US)

(72) Inventors: Avirup Saha, Kolkata (IN); Balaji Ganesan, Bengaluru (IN); Shettigar Parkala Srinivas, Bangalore (IN); Sumit Bhatia, New Delhi (IN); Sameep Mehta, Bangalore (IN); Soma Shekar Naganna, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 17/518,195

(22) Filed: Nov. 3, 2021

(65) Prior Publication Data

US 2023/0135407 A1     May 4, 2023

(51) Int. Cl.
    *G06F 16/00*     (2019.01)
    *G06F 16/28*     (2019.01)
    *G06F 17/18*     (2006.01)

(52) U.S. Cl.
    CPC ............ *G06F 16/285* (2019.01); *G06F 17/18* (2013.01)

(58) Field of Classification Search
CPC ...... G06F 18/2413; G06F 16/21; G06F 16/43; G06F 16/953; G06F 18/2185; G06F 18/23213; G06F 18/2415; G06F 11/2094; G06F 16/29; G06F 3/04847; G06F 7/00; G06F 8/00; G06F 9/00; G06F 5/00; G06F 3/00; G06Q 10/10; G06N 3/045; G09G 2354/00; G09G 2370/022; G09G 5/14
See application file for complete search history.

(56) References Cited

U.S. PATENT DOCUMENTS 8,239,426 B2    8/2012   Rangadass et al.
10,946,311 B1    3/2021   McNair
(Continued)

OTHER PUBLICATIONS

Du et al., Dirichlet-hawkes processes with applications to clustering continuous-time document streams, Proceedings of the 21th ACM SIGKDD International Conference on Knowledge Discovery and Data Mining, pp. 219-228, Aug. 10-13, 2015.
(Continued)

*Primary Examiner* — Shyue Jiunn Hwa
(74) *Attorney, Agent, or Firm* — Garg Law Firm, PLLC; Rakesh Garg; Kimberly Zillig

(57) ABSTRACT

An embodiment establishes a designated attribute value as a semantic criterion for grouping records in a bucket, identifies a first set of records having attribute values that satisfy the semantic criterion, and adds the first set of records to the bucket. The embodiment detects that the first set of records represent a first series of events that occurred in succession at respective times. The embodiment derives a temporal attribute value representative of a time pattern formed by the times of the first series of events and designates the temporal attribute value as a temporal criterion for grouping records in the bucket. The embodiment identifies a second set of records that represent a second series of events and satisfy the temporal criterion and adds the second set of records to the bucket based at least in part on the second set of records satisfying the temporal criterion.

20 Claims, 8 Drawing Sheets

(56) References Cited

U.S. PATENT DOCUMENTS

| | | | | |
|---|---|---|---|---|
| 2011/0173235 | A1* | 7/2011 | Aman | G06V 40/23 707/E17.055 |
| 2015/0269383 | A1* | 9/2015 | Lang | G06F 21/604 726/1 |
| 2017/0006141 | A1* | 1/2017 | Bhadra | H04W 4/70 |
| 2019/0294619 | A1 | 9/2019 | Mohanlal et al. | |
| 2020/0242134 | A1 | 7/2020 | Salhin | |

OTHER PUBLICATIONS

Zheng et al., Identifying Hidden Buyers in Darknet Markets via Dirichlet Hawkes Process, Nov. 12, 2019.

Mavroforakis et al., Modeling the dynamics of online learning activity, Oct. 18, 2016.

Seonwoo et al., Hierarchical Dirichlet Gaussian marked Hawkes process for narrative reconstruction in continuous time domain, Proceedings of the 2018 Conference on Empirical Methods in Natural Language Processing, pp. 3316-3325, Oct. 31-Nov. 4, 2018.

Whang et al., Entity resolution with iterative blocking, Proceedings of the 2009 ACm SIGMOD International Conference on Management of data, pp. 219-232, Jun. 29-Jul. 2, 2009.

Papadakis et al., A blocking framework for entity resolution in highly heterogeneous information spaces, IEEE Transactions on Knowledge and Data Engineering 25, No. 12 (2012): 2665-2682, Jul. 31, 2012.

Papadakis, Blocking Techniques for efficient Entity Resolution over large, highly heterogeneous Information Spaces, PhD diss., Hannover: Gottfried Wilhelm Leibniz Universität Hannover, 2013.

Papadakis et al., Meta-blocking: Taking entity resolution to the next level, IEEE Transactions on Knowledge and Data Engineering 26, No. 8 (2013): 1946-1960, Mar. 27, 2013.

Efthymiou et al., Parallel meta-blocking: Realizing scalable entity resolution over large, heterogeneous data, 2015 IEEE International Conference on Big Data (Big Data), pp. 411-420. IEEE, Oct. 29-Nov. 1, 2015.

Konda et al., Magellan: Toward building entity matching management systems, Proceedings of the VLDB Endowment, vol. 9, No. 12 (2016), pp. 1197-1208, Aug. 1, 2016.

* cited by examiner

BUCKETING RECORDS USING TEMPORAL POINT PROCESSES

BACKGROUND

The present invention relates generally to a method, system, and computer program product for data processing. More particularly, the present invention relates to a method, system, and computer program product which uses temporal point processes for bucketing records.

Master Data Management (MDM) systems serve a central data repository for multiple data sources and aim to organize and standardize an organization's important data. For example, an enterprise-level MDM may be used to consolidate and organize data from several different organizations that provide data in various different formats. One common task performed by MDM systems is entity resolution, which involves identifying which of multiple records refer to the same real-world entity.

Entity resolution is often a complex task due to the introduction of data from multiple different data sources that may have the same information stored in different ways. For example, one data source may include a person's legal forename, while another instead includes a preferred name or nickname, and yet another includes only an initial of either the legal forename, the nickname, or a middle name. Similarly, different data sources may include different versions of the name of a business entity, such as a company's common trade name stored in one data source and the company's more formal legal name stored in another data source. Entity resolution processes work to match these records in an effort to reduce duplicate records and improve the overall performance of the MDM repository.

SUMMARY

The illustrative embodiments provide for bucketing records using temporal point processes. An embodiment includes establishing a first designated attribute value as a semantic criterion for grouping records in a first bucket. The embodiment also includes identifying a first set of records having respective attribute values that satisfy the semantic criterion. The embodiment also includes adding the first set of records to the first bucket. The embodiment also includes detecting that the first set of records represent respective events in a first series of events that occurred in succession at respective times. The embodiment also includes deriving a temporal attribute value as a temporal attribute, where the temporal attribute value is representative of a time pattern formed by the respective times of the first series of events. The embodiment also includes designating the temporal attribute value as a temporal criterion for grouping records in the first bucket. The embodiment also includes identifying a second set of records that represent respective events in a second series of events and satisfy the temporal criterion. The embodiment also includes adding the second set of records to the first bucket based at least in part on the identifying of the second set of records as satisfying the temporal criterion. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
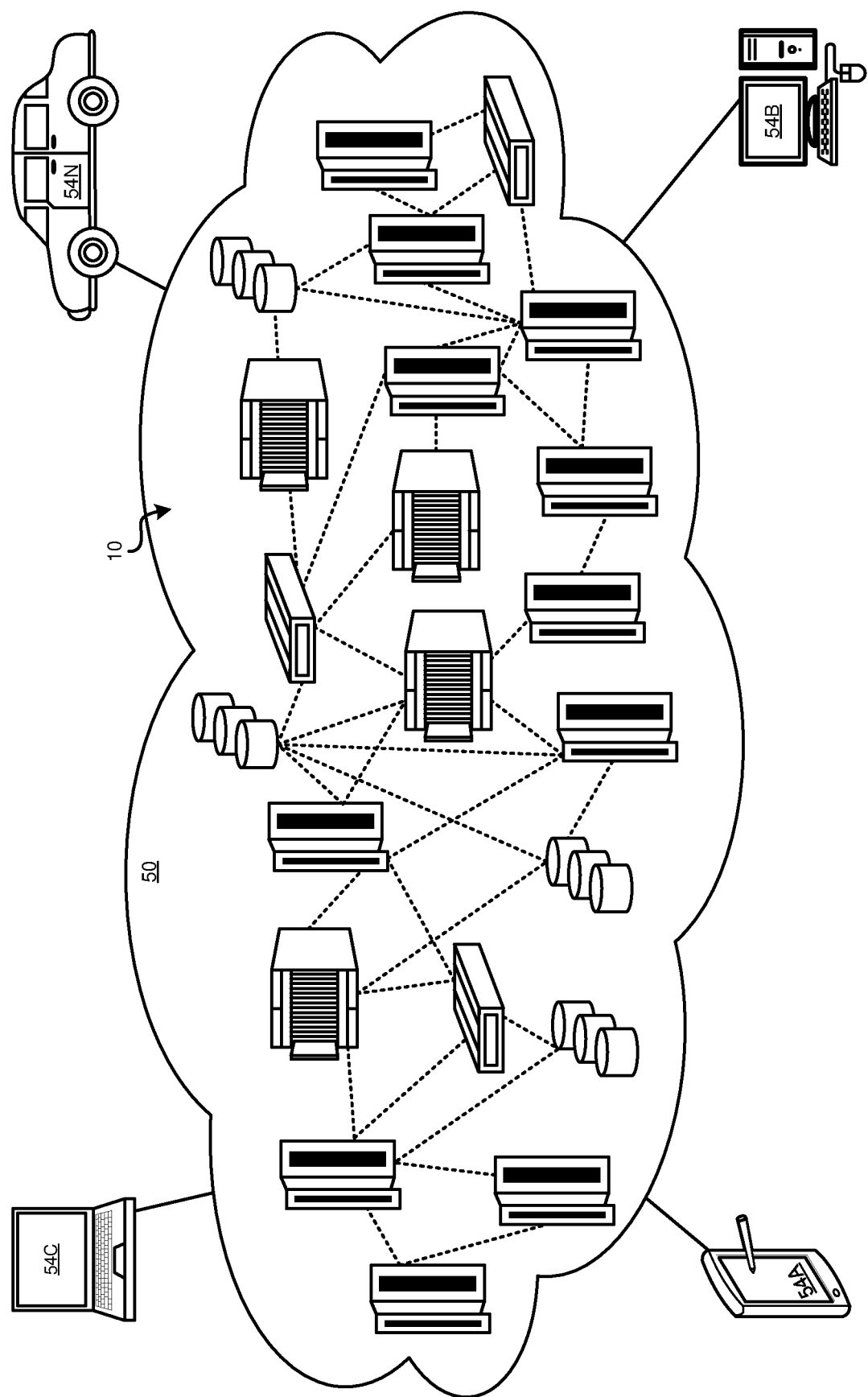
FIG. 1 depicts a cloud computing environment according to an embodiment of the present invention.

A factor that complicates the entity resolution process is that the number of records handled by an MDM system may exceed an absolute or practical limit of a downstream application. For example, in some cases the number of records handled by an MDM exceed the number of records that a downstream application can effectively process by several orders of magnitude. MDM systems address this issue using a process known as bucketing (also sometimes referred to as blocking). Bucketing involves grouping entity records such that, ideally, after bucketing is complete, records related to an actual entity are unlikely to be present in more than one bucket.

An entity resolution system may perform a bucketing process to logically group records together in order to benefit from the many advantages that stem from bucketing. For example, bucketing eliminates unnecessary subsequent processing (i.e., subsequent entity resolution processing) of data that is completely unrelated. This exponentially increases efficiency by reducing the pool of data being subsequently processed to only data that is identified by the bucketing algorithm as being semantically similar. Thus, when a downstream application queries entity records, the application will only query the records within specific buckets that a bucketing algorithm identified as being likely to include the data of interest. Bucketing also ensures scalability, in that regardless of how much data exists, buckets with manageable numbers of records may still be generated for downstream processing.

Bucketing systems may generate buckets according to various algorithms that range in terms of complexity. For example, a simple bucketing algorithm may involve presorting data by a presorting field or by very simplistic rules, such as grouping all people with the same last name or the same zip code. More complex bucketing algorithms use additional metadata attributes that are generated for individual records to expand the scope of the records that can be used for comparisons. Examples of such metadata attributes include phonetic representations of data in which alphabetic characters are used to represent sounds of names when pronounced (e.g., mapping "RBRT" to "ROBERT" and "PT" to "PATTY"). Other bucketing algorithms use nickname translation that includes common alternative names and may also include common misspellings of names (e.g., a search for "JOHN" includes searching for "JON" and "JONATHAN" or a search for "GREEN" includes searching for "GREN" and "GREAN").

These more complex bucketing algorithms allow records associated with an entity to be identified despite variations resulting from misspellings or the use of nicknames in the data. However, even these more complex bucketing algorithms still rely on a certain legitimacy of the data. In other words, these algorithms allow for entity identification despite identity-data variations stemming from common substitutions or human error, rather than from attempts to intentionally obscure the actual identity of a responsible entity. As a result, these bucketing algorithms are of limited usefulness for situations where a record stems from an attempt to conceal or alter the identity of a responsible entity by providing fictitious identity data. For example, these algorithms are unlikely to group records that are actually associated with the same entity, but where the records include identity attributes that are completely different and unrelated (i.e., one is not a nickname or common substitution of the other).

Aspects of the disclosure address the deficiencies described above by providing mechanisms (e.g., systems, methods, machine-readable media, etc.) that perform a bucketing algorithm that includes temporal point processes. This temporal approach to grouping records based at least in part on temporal similarities allows for grouping records using attributes that are not dependent upon identity attributes that may or may not be fictional identity attributes. As a result, entity resolution or identification applications that involve matching records that contain fictional identity data may include such temporal bucketing algorithms and thereby benefit from the performance and scalability improvements bucketing provides.

Thus, the illustrative embodiments recognize that the existing bucketing techniques may be improved by considering the temporal aspect of the data, particularly for entity resolution tasks. For example, illustrative embodiments recognize that an entity that provides fictional identity information may nevertheless generate, or cause the generation of, data records having temporally-identifiable relationships. Disclosed embodiments include entity resolution systems that perform bucketing algorithms that apply temporal point processes to data records to identify such temporal relationships.

In some embodiments, an entity resolution system performs a data matching process for optimizing searches, additions, and updates to existing data in a database. In some embodiments, the data matching process includes data standardization, bucketing, and comparison processes. In some such embodiments, when an entity resolution system receives original data, the entity resolution system may perform a standardization process in which it generates and stores a standardized version of the original data. The purpose of the standardization process is to generate a standardized version of the original data that is stored in a uniform format that is consistent with other standardized data in the database.

In some embodiments, the standardization process includes one or more of many known standardization techniques, such as converting textual data to all capital letters and stripping out non-print characters (e.g., carriage returns, line feeds, and tabs). In some embodiments, the standardization process includes one or more of many known data validation and filtering techniques, such as checking for valid zip code or email values and removing those that are detected to be invalid. In some embodiments, the standardization process includes generating phonetic metadata and/or performing nickname translation as described above. In some embodiments, the standardized data is used for matching and linking processes, including bucketing processes. In some embodiments, the original data is retained in the database and used for display to users.

In some embodiments, an entity resolution system performs a bucketing algorithm that applies a combination of semantic matching and temporal matching to identify related records. Also, in some such embodiments, an entity resolution system performs a bucketing algorithm that applies a semantic matching algorithm to generate a bucket of related records, and applies temporal matching to incoming streaming data to update the bucket with temporally related records from the streaming data.

Semantic matching (or semantic similarity) as used herein refers to matching records based on a similarity of identity attributes, for example by matching such things as names and addresses. Temporal matching (or temporal similarity) as used herein refers to matching records based on temporal patterns determined based on temporal attributes, for example derived using temporal point processes of dates and/or timestamps.

In some embodiments, the bucketing algorithm stores one or more attributes of each record as hash values in a bucket. In some embodiments, the bucketing algorithm uses standardized data for generating the hash values for bucketing. In some embodiments, the bucketing algorithm generates the hash values using a known hashing algorithm, for example secure hashing algorithm 2 (SHA2). In some embodiments, the hashed values are then used downstream for comparing bucket data to a search string by converting the search string to a hash value and then comparing the hashed version of the search string to the hashed bucket values.

In some embodiments, the bucketing algorithm considers semantically-similar records to be records having more than a threshold degree of similarity between their respective identity attributes. In some embodiments, records having more than 50% identical identity attributes are considered to be semantically-similar records. In an embodiment, the threshold is set at 75% identical identity attributes. In some embodiments, other threshold levels are used to increase the number of semantically-similar records with a lower threshold, at the possible expense of incorrectly matched records. In some embodiments, a higher threshold level is used to decrease the likelihood of incorrectly matched records, at the possible expense of failing to match all records associated with a particular entity. In some embodiments, threshold values are adjusted to increase or decrease the number of matching records returned.

In some embodiments, the bucketing algorithm performs temporal matching that includes modeling temporal dynamics of attributes to group together records with similar time patterns. Such embodiments are based on a recognition that a single entity may generate data records in characteristic temporal sequences due to related activities captured by independent data sources. In some embodiments, the temporal matching models the points in time at which data records are generated as binary events. The temporal matching evaluates the binary events to detect groups of binary events that form temporal point processes.

Temporal point processes each include a time-series of binary events that occur in continuous time. At each point in time, there are only two possible values for the point process: a first value indicating that an event occurred, or a second value indicating that an event did not occur. In some embodiments, a temporal matching process defines a temporal attribute as a discrete set of binary events that occur in a certain time pattern within a window of time. For example, in some embodiments, a temporal attribute includes a period of time that defines a process window during which the binary events of a temporal point process occur. The temporal attribute may also include either a series of times within the process window indicating when the events occur, or a series of waiting periods within the process window between the occurrences of events.

In some embodiments, the bucketing algorithm performs temporal matching that includes modeling a process window as a series of evenly-spaced time intervals and generating an expression of a temporal attribute in terms of the number of binary events that occur in each interval. In some such embodiments, the temporal matching process sets the time intervals to be too small for any interval to include more than one event, which allows the temporal matching process to express a temporal attribute as a sequence of zeros and ones indicating which time intervals include an event and which do not.

In some embodiments, the bucketing algorithm uses temporal matching to group records that have similar temporal attributes into a bucket, where the temporal attributes are modeled as temporal point processes that describe respective patterns of similar events that occur according to similar time patterns. In some such embodiments, a temporal attribute may be derived from a series of transactions that an entity tends to repeat according to similar time patterns.

Using a non-limiting example of banking data for the sake of explanation, account holders tend to have unique temporal dynamics, which in this example refers to the time patterns of account transactions. As a simple example, a series of banking records for a first account may indicate a pattern in which the account holder receives a direct deposit, followed a few hours later by the account holder making a balance inquiry, followed an hour later by the account holder requesting a wire transfer. The temporal matching process models this time pattern of transactions as a series of binary events of a temporal point process and matches the associated records with other groups of records that indicate similar time patterns of transactions and therefore have similar temporal attributes.

If the temporal matching process identifies records of a second account that have a similar temporal attribute, this may indicate that the second account belongs to the same entity as the first account. If the identity information for the account holders of the first and second accounts do not match, a downstream application may flag these accounts for review or identity verification. Thus, the temporal matching process allows the bank to identify accounts in which an account holder may have used fictional identity information when opening the account based on similar temporal attributes indicative of time patterns of the account holder's activities.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and such are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
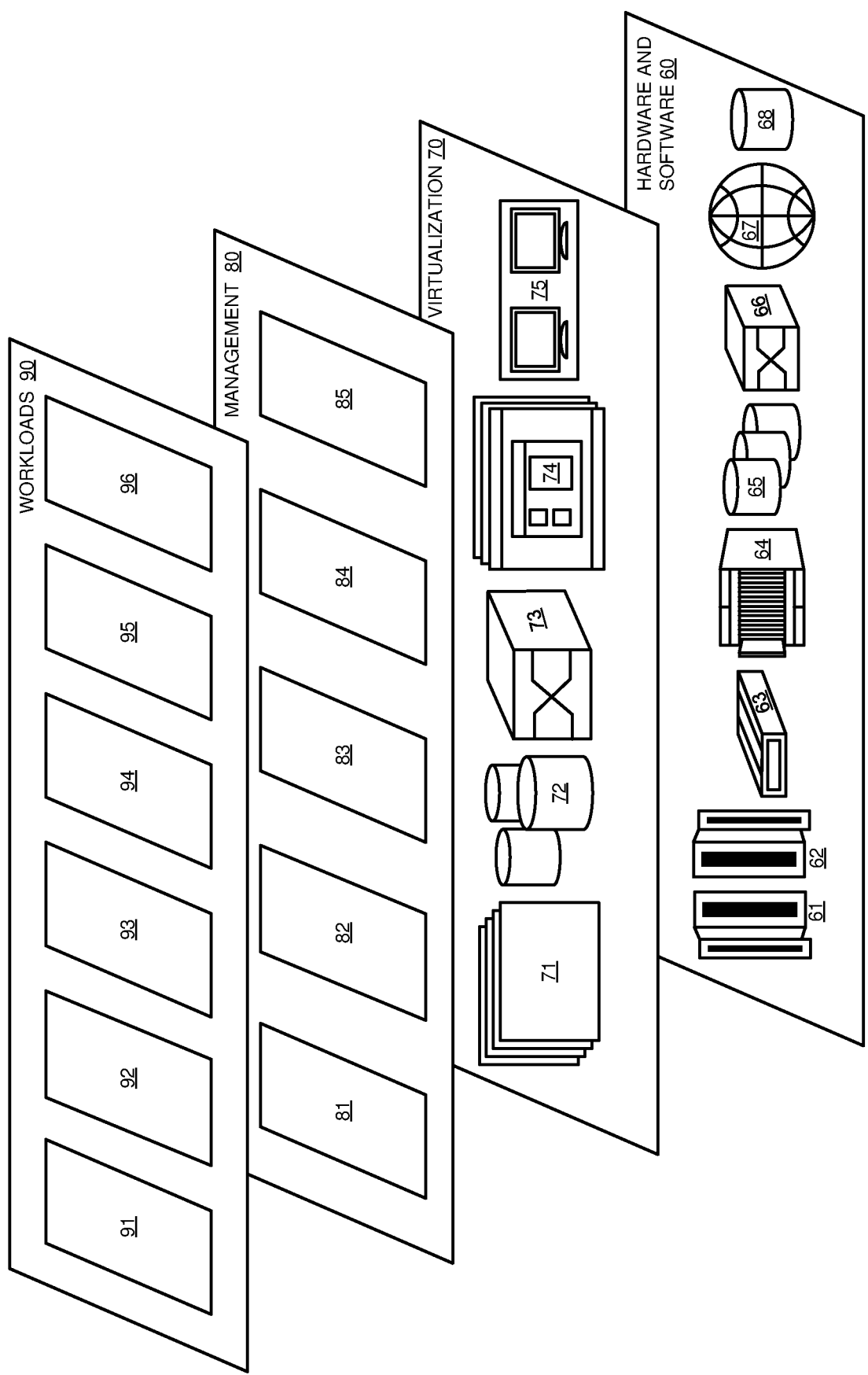
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and master data management (MDM) processing 96.

Figure 3:
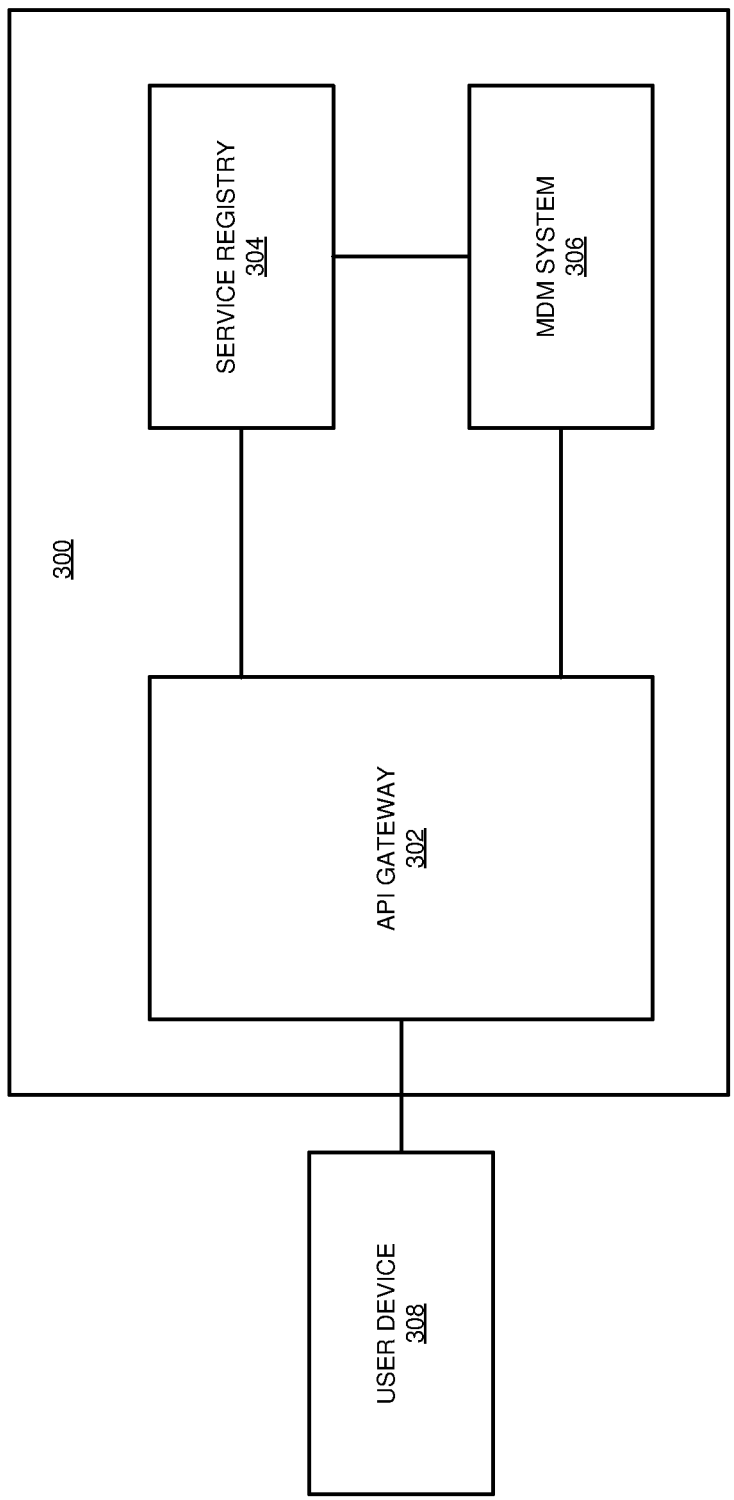
FIG. 3 depicts a block diagram of an example service infrastructure that includes an MDM system in accordance with an illustrative embodiment.

With reference to FIG. 3, this figure depicts a block diagram of an example service infrastructure 300 that includes an MDM system 306 in accordance with an illustrative embodiment. In some embodiments, the MDM system 306 is deployed in workloads layer 90 of FIG. 2. By way of example, in some embodiments, MDM system 306 is implemented as MDM processing 96 in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated MDM system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like MDM system 306. API gateway 302 receives service requests issued by client applications, and creates service lookup requests based on service requests. As a non-limiting example, in an embodiment, the user device 308 is a card reader device that executes an access routine to determine whether to grant access to a workspace in response to a sensed access card.

In the illustrated embodiment, service infrastructure 300 includes a service registry 304. In some embodiments, service registry 304 looks up service instances of MDM system 306 in response to a service lookup request such as one from API gateway 302 in response to a service request from user device 308. For example, in some embodiments, the service registry 304 looks up service instances of MDM system 306 in response to requests related to dubbing and machine translation from the user device 308.

In some embodiments, the service infrastructure 300 includes one or more instances of the MDM system 306. In some such embodiments, each of the multiple instances of the MDM system 306 run independently on multiple computing systems. In some such embodiments, MDM system 306, as well as other service instances of MDM system 306, are registered in service registry 304.

In some embodiments, service registry 304 maintains information about the status or health of each service instance including performance information associated with each of the service instances. For example, as described in more detail herein, such performance information may include several types of performance characteristics of a given service instance (e.g., cache metrics, etc.). As described in more detail herein, extended service registry 304 ranks service instances based on their respective performance characteristics, and selects top-ranking service instances for service discovery or service lookup requests. In the event that a service instance becomes unresponsive or unhealthy, the service registry will no longer provide its address or information about this service instance to other services.

Figure 4:
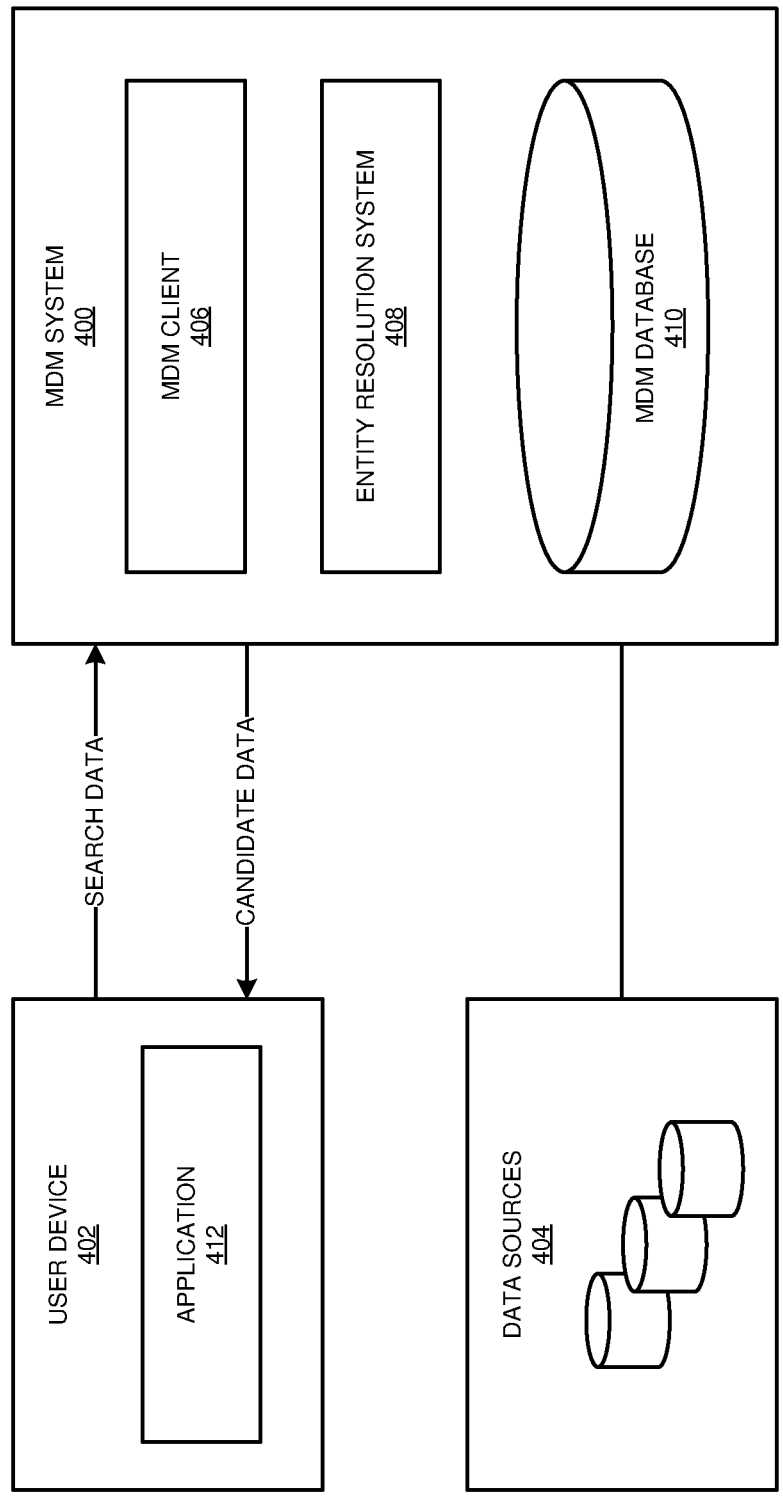
FIG. 4 depicts a block diagram of an MDM system in accordance with an illustrative embodiment.

With reference to FIG. 4, this figure depicts a block diagram of an MDM system 400 in accordance with an illustrative embodiment. In a particular embodiment, MDM system 400 is an example of MDM system 306 of FIG. 3.

In the illustrated embodiment, the MDM system 400 is in communication with a user device 402 and one or more data sources 404. The MDM system 400 includes an MDM client 406, an entity resolution system 408, and MDM database 410. In alternative embodiments, the MDM system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the MDM system 400 manages and maintains records that are considered most important (master data). This concept is important for business with multiple units that have their own individual databases of records, like a credit card division and a debit card division of a bank as an example.

Data sources 404 represent underlying data source systems with data records to be consolidated and merged in the MDM database 410. Data sources 404 feed their data to an MDM system 400, implemented as one or more computer systems, for instance. The MDM system 400 runs MDM client 406 to receive data of data records from the source clients using any of a variety of known protocols or interfaces, for example using a REST API. MDM system 400 exposes API services in an API services layer (e.g., API gateway 302 of FIG. 3) for the MDM client 406 to feed the record data into the MDM system 400. Incoming record data received by MDM system 400 passes through the entity resolution system 408, in which candidates are selected and match processing is performed. The master data is then persisted into the MDM database 410. In some embodiments, the MDM database 410 stores operational data, which refers to the dataset—the actual data records. In some embodiments, the MDM database 410 also maintains bucket hashes and other indices.

In some embodiments, in a sequence of events, an incoming add/update/search request is made to MDM system 400 from an application 412 that sends search data to the MDM system 400. In some embodiments, the user device 402 is implemented as a computer running the application 412. The entity resolution system 408 generates bucket hashes per bucket role(s) defined in the MDM system 400. Using these hashes, a set of candidates are selected from the MDM database 410 and sent to the application 412 as a response to the search data. The data considered critical for matching is also fetched for these candidates and provided to the application 412. The entity resolution system 408 also compares incoming new records from data sources 404 against candidates for matching and bucketing the new data. The candidates that score above a defined threshold are considered matches to the new data.

Figure 5:
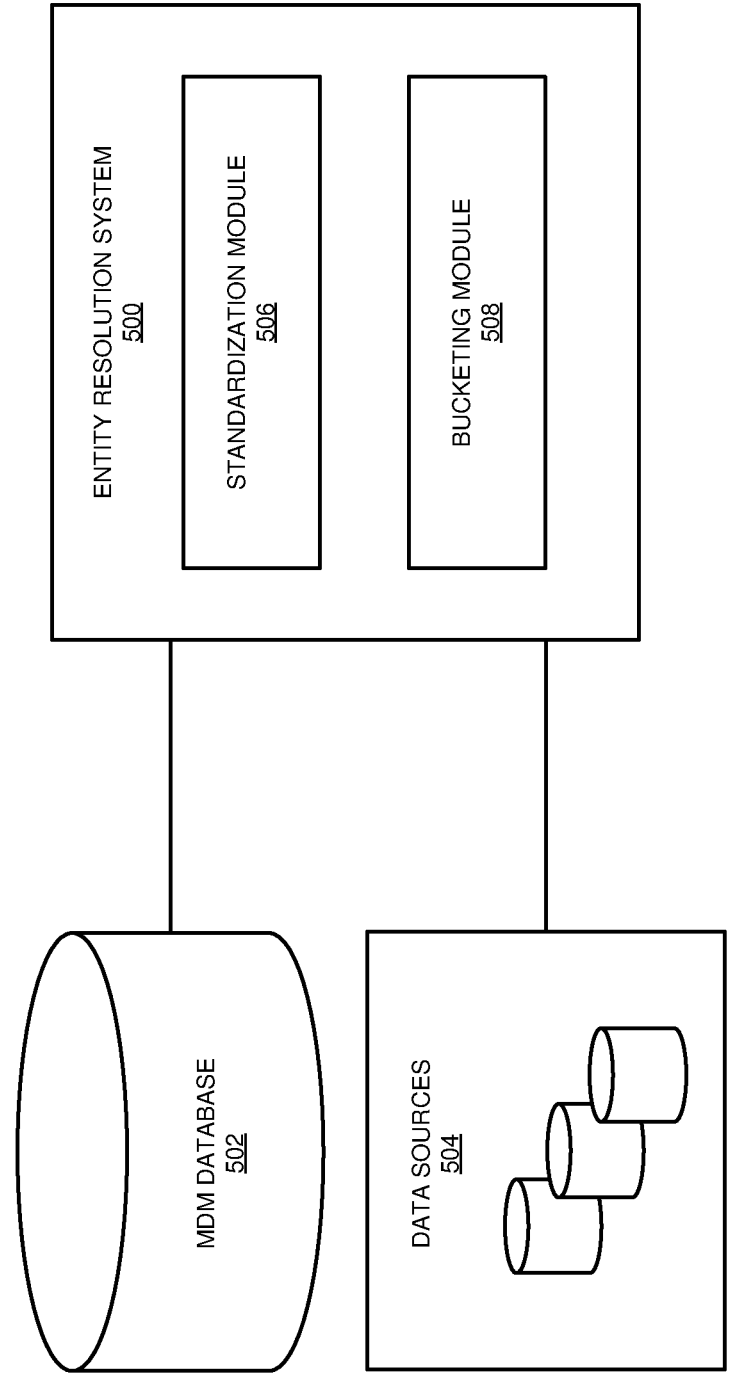
FIG. 5 depicts a block diagram of an entity resolution system in accordance with an illustrative embodiment.

With reference to FIG. 5, this figure depicts a block diagram of an entity resolution system 500 in accordance with an illustrative embodiment. In a particular embodiment, entity resolution system 500 is an example of entity resolution system 408 of FIG. 4. In the illustrated embodiment, the entity resolution system 500 is in communication with an MDM database 502 and one or more data sources 504. In a particular embodiment, the MDM database 502 is an example of the MDM database 410 of FIG. 4, and data sources 504 are an example of data sources 404 of FIG. 4.

In the illustrated embodiment, the entity resolution system 500 includes a standardization module 506 and a bucketing module 508. In alternative embodiments, the entity resolution system 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the entity resolution system 500 identifies which of multiple records in the MDM database 502 refer to the same real-world entity. For example, if a patient visits multiple medical facilities, that patient's information may be entered in different ways in each facility. For instance, the patient's middle name may be entered in some facilities and not others, or the patient may use her work phone number at some facilities and her mobile phone number at others. Entity resolution may be further complicated by name and attribute ambiguity, errors occurring during data entry, missing values, and false values provided as fictional data from an entity seeking to alter or obscure their actual identity.

In the illustrated embodiment, the entity resolution system 500 performs a data matching process for optimizing searches, additions, and updates from the data sources 504 to the MDM database 502. In some embodiments, the data matching process includes a data standardization process performed by the standardization module 506 and a bucketing process performed by the bucketing module 508.

In some such embodiments, when the entity resolution system 500 receives data from the data sources 504 (sometimes referred to as the original data), the standardization module 506 performs a standardization process in which the standardization module 506 generates a standardized version of the original data. The purpose of the standardization process is to generate a standardized version of the original data that is stored in a uniform format that is consistent with other standardized data in the MDM database 502.

In some embodiments, the standardization module 506 performs one or more of many known standardization techniques on original data received from the data sources 504, such as converting textual data to all capital letters and stripping out non-print characters (e.g., carriage returns, line feeds, and tabs). In some embodiments, the standardization module 506 performs one or more of many known data validation and filtering techniques on original data received from the data sources 504, such as checking for valid zip code or email values and removing those that are detected to be invalid. In some embodiments, the standardization module 506 generates phonetic metadata and/or performs nickname translation as described above. In some embodiments, the standardized data is provided to the bucketing module 508, which uses the standardized data for bucketing processes. In some embodiments, the original data is retained in the MDM database 502 and is used for display to users.

In some embodiments, the bucketing module 508 performs a bucketing algorithm that applies a combination of semantic matching and temporal matching to identify related records. In some embodiments, the bucketing module 508 performs a bucketing algorithm that applies a semantic matching algorithm to generate a bucket of related records, and applies temporal matching to incoming streaming data to update the bucket with temporally related records from the streaming data.

In some embodiments, the bucketing module 508 stores one or more attributes of each record as hash values in a bucket. In some embodiments, the bucketing module 508 uses standardized data for generating the hash values for bucketing. In some embodiments, the bucketing module 508 generates the hash values using a known hashing algorithm, for example secure hashing algorithm 2 (SHA2). In some embodiments, the hashed values are then used downstream (e.g., by application 412 of FIG. 4) for comparing bucket data to a search string by converting the search string to a hash value and then comparing the hashed version of the search string to the hashed bucket values.

Figure 6:
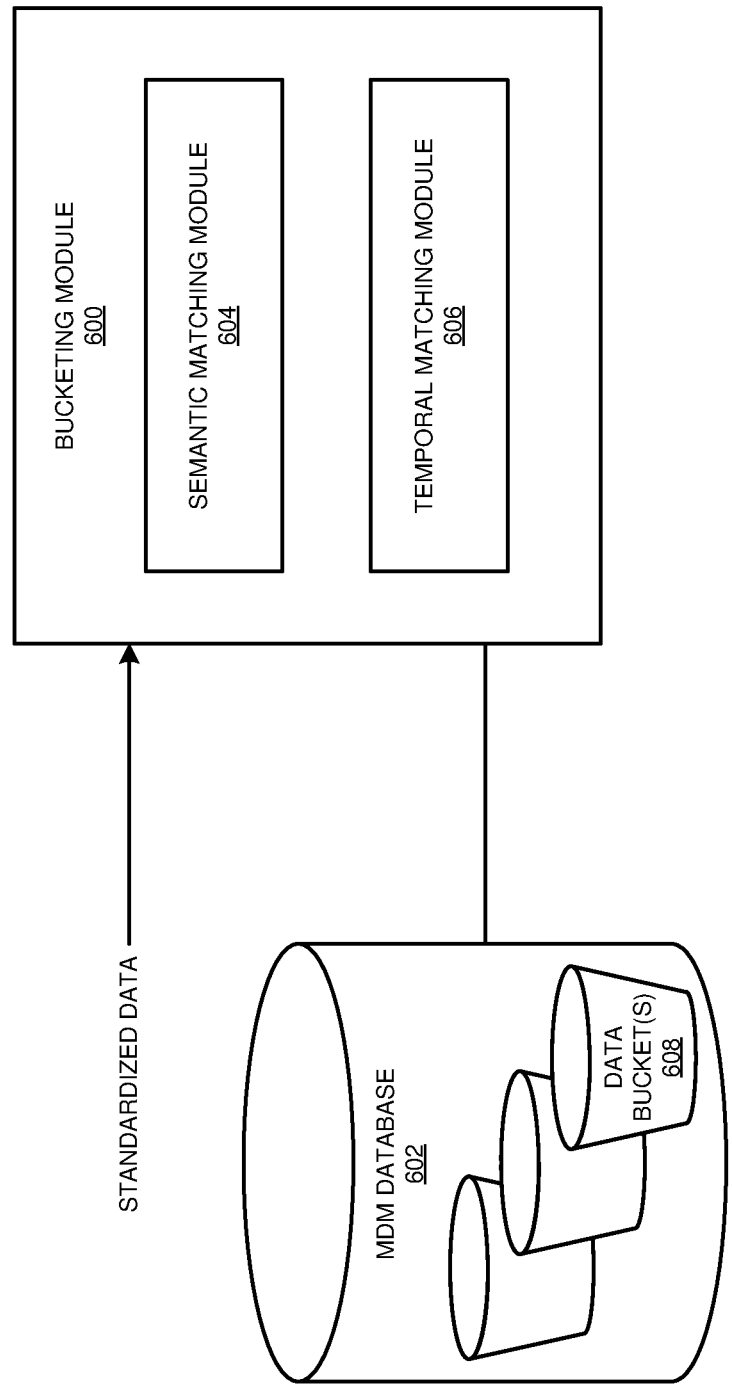
FIG. 6 depicts a block diagram of a bucketing module in accordance with an illustrative embodiment.

With reference to FIG. 6, this figure depicts a block diagram of a bucketing module 600 in accordance with an illustrative embodiment. In a particular embodiment, bucketing module 600 is an example of bucketing module 508 of FIG. 5. In the illustrated embodiment, the bucketing module 600 is in communication with an MDM database 602 that stores one or more data buckets 608. In a particular embodiment, the MDM database 602 is an example of the MDM database 410 of FIG. 4 or MDM database 502 of FIG. 5.

In the illustrated embodiment, the bucketing module 600 includes a semantic matching module 604 and a temporal matching module 606. In alternative embodiments, the bucketing module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the bucketing module 600 applies a bucketing algorithm on standardized data, such as standardized data prepared by the standardization module 506 of FIG. 5. In some embodiments, the bucketing module 600 identifies related records using a combination of the semantic matching module 604 that applies semantic matching and the temporal matching module 606 that applies temporal matching. In some embodiments, the semantic matching module 604 performs a semantic matching algorithm to generate a bucket of related records, and the temporal matching module 606 applies temporal matching to incoming streaming data to update the bucket with temporally related records from the streaming data.

In some embodiments, the semantic matching module 604 evaluates records as being semantically-similar records if the records have more than a threshold degree of similarity between their respective identity attributes. In some embodiments, the semantic matching module 604 considers records having more than 50% identical identity attributes to be semantically-similar records. In an embodiment, the semantic matching module 604 considers records having more than 75% identical identity attributes to be semantically-similar records. In some embodiments, the semantic matching module 604 uses other threshold levels to increase the number of semantically-similar records with a lower threshold, at the possible expense of incorrectly matched records. In some embodiments, the semantic matching module 604 uses a higher threshold level to decrease the likelihood of incorrectly matched records, at the possible expense of failing to match all records associated with a particular entity. In some embodiments, the semantic matching module 604 adjusts threshold values to increase or decrease the number of matching records returned.

In some embodiments, the temporal matching module 606 performs temporal matching that includes modeling temporal dynamics of attributes to group together records with similar time patterns. Such embodiments are based on a recognition that a single entity may generate data records in characteristic temporal sequences due to related activities captured by independent data sources. In some embodiments, the temporal matching module 606 performs temporal matching that models the points in time at which data records are generated as binary events. In some embodiments, the temporal matching module 606 evaluates the binary events to detect groups of binary events that form temporal point processes.

In some embodiments, the temporal matching module 606 performs temporal matching using temporal point processes that each include a time-series of binary events that occur in continuous time. In a time-series of binary events, at each point in time, there are only two possible values for the point process: a first value indicating that an event occurred, or a second value indicating that an event did not occur. In some embodiments, the temporal matching module 606 uses temporal matching process that defines a temporal attribute as a discrete set of binary events that occur in a certain time pattern within a window of time. For example, in some embodiments, a temporal attribute includes a period of time that defines a process window during which the binary events of a temporal point process occur. The temporal attribute may also include either a series of times within the process window that the events occur, or a series of waiting periods within the process window between the occurrences of events.

Figure 7:
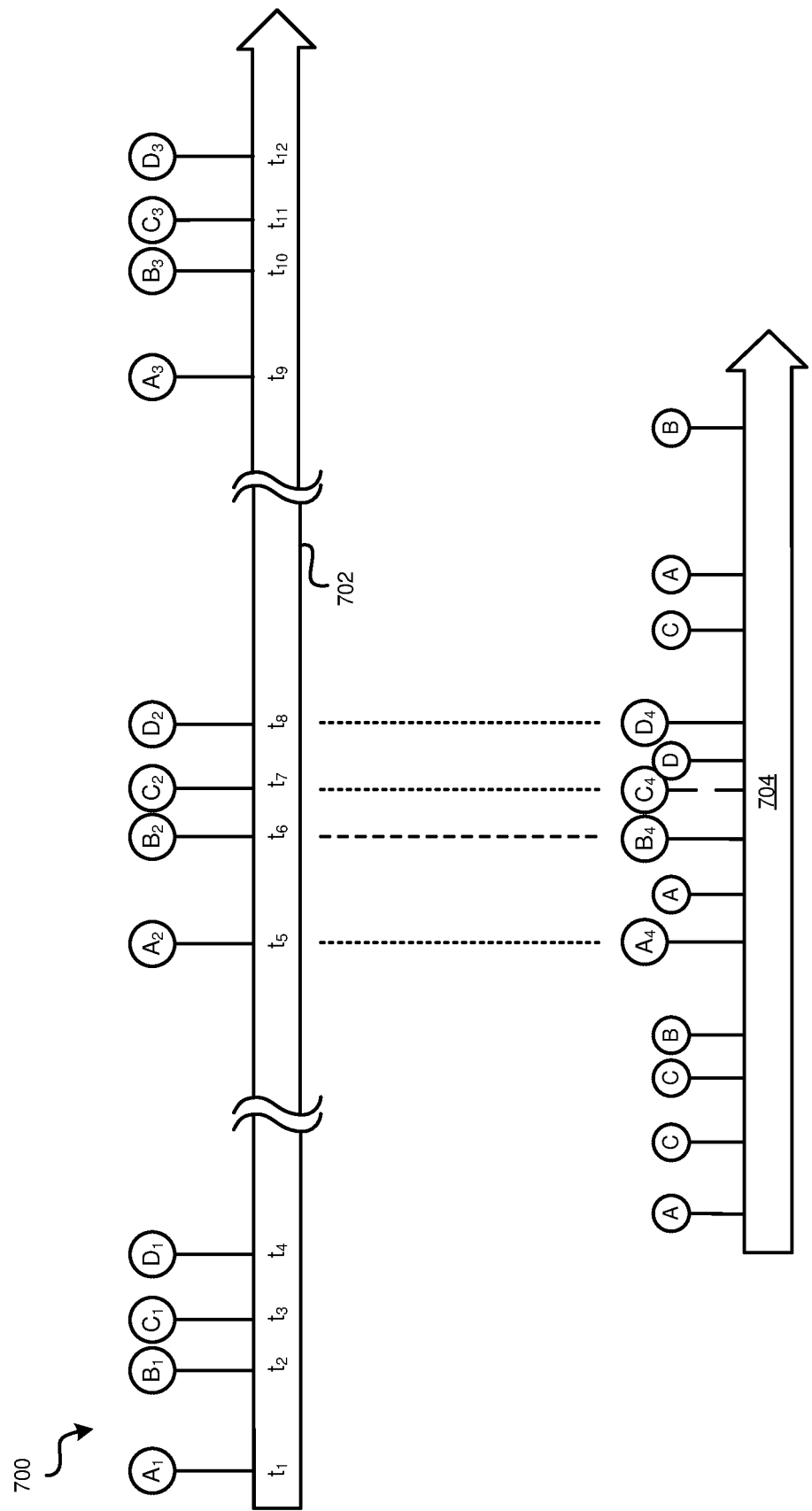
FIG. 7 depicts a graphical view of exemplary time-series of binary events in accordance with an illustrative embodiment.

With reference to FIG. 7, this figure depicts a graphical view 700 of exemplary time-series of binary events in accordance with an illustrative embodiment. In some embodiments, the view 700 includes a first timeline 702 showing multiple occurrences of a temporal point process in isolation and a second timeline 704 showing the temporal point process intermingled with other events.

As a non-limiting example, a temporal point process includes a time-series of binary events designated as events An-Dn, where n is an integer indicative of an occurrence of the series of events. The timeline 702 shows three occurrents of the series, where the first occurrence includes events $A_1$, $B_1$, $C_1$, and $D_1$, which occur at respective times $t_1$, $t_2$, $t_3$, and $t_4$. The temporal matching module 606 models the events $A_1$-$D_1$ as a stochastic process comprising events that are localized at a finite set of time points. This allows the temporal matching module 606 to model the events as a time-series of binary events. In some embodiments, the temporal matching module 606 then expresses the series of events as a probability model.

In some embodiments, the temporal matching module 606 may determine a probability distribution over time of the events occurring based on the relative spike times (i.e., event times $t_1$, $t_2$, $t_3$, and $t_4$) or based on inter-spike intervals (i.e., time intervals $t_2$–$t_1$, $t_3$–$t_2$, and $t_4$–$t_3$). Thus, in some embodiments, the temporal matching module 606 defines a temporal attribute based on the discrete set of binary events $A_1$-$D_1$. The temporal matching module 606 then uses this temporal attribute for matching records of events $A_1$-$D_1$ with records of events $A_2$-$D_2$ and with records of events $A_3$-$D_3$ and bucketing them together in a bucket 608. In some embodiments, the bucketing module 600 receives streaming data representative of a series of events as shown along timeline 704. The temporal matching module 606 uses this temporal attribute for matching records of events $A_4$-$D_4$ with records of events $A_1$-$D_1$ and bucketing them together in a bucket 608 even when events $A_4$-$D_4$ are interspersed amongst other events.

In some embodiments, the temporal matching module 606 performs temporal matching that includes modeling a process window as a series of evenly-spaced time intervals and generating an expression of a temporal attribute in terms of the number of binary events that occur in each interval. In some such embodiments, temporal matching module 606 sets the time intervals to be too small for any interval to include more than one event, which allows the temporal matching module 606 to express a temporal attribute as a sequence of zeros and ones indicating which time intervals include an event and which do not.

In some embodiments, temporal matching module 606 uses temporal matching to group records that have similar temporal attributes into a bucket 608, where the temporal attributes are modeled as temporal point processes that describe respective patterns of similar events that occur according to similar time patterns. In some such embodiments, a temporal attribute may be derived from a series of transactions that an entity tends to repeat according to similar time patterns.

Using a non-limiting example of banking data for the sake of explanation, account holders tend to have unique temporal dynamics, which in this example refers to the time patterns of account transactions. Events A-D in FIG. 7 may be representative of any types of events, but for the sake of explanation, in a simple example the events A-D may be representative of respective types of banking transactions. For example, events A-D may be represented by a series of banking records for a first account, where the records indicate a pattern in which the account holder receives a direct deposit (event A), followed three hours later by the account holder making a balance inquiry (event B), followed an hour later by the account holder requesting a wire transfer (event C), followed a couple of hours later by an ATM withdrawal (event D). This particular account holder follows a similar pattern of performing these four transactions on a regular basis. For example, events $A_1$-$D_1$ may occur two weeks before events $A_2$-$D_2$, which occur two weeks before events $A_3$-$D_3$, and so on. In some embodiments, the temporal matching module 606 models this time pattern of transactions as a series of binary events of a temporal point process and matches the associated records with other groups of records that indicate similar time patterns of transactions and therefore have similar temporal attributes.

If the temporal matching process identifies records of a second account that have a similar temporal attribute, the temporal matching module 606 may detect that the second account belongs to the same entity as the first account. If the identity information for the account holders of the first and second accounts do not match, the bucketing module 600 or a downstream application may flag these accounts for review or for identity verification. Thus, the temporal matching module 606 allows the bank to identify accounts in which an account holder may have used fictional identity information when opening the account based on similar temporal attributes indicative of time patterns of the account holder's activities. Also, in an embodiment, the events $A_4$, $B_4$, and $D_4$ indicate the same account holder as other events having the same temporal attributes as events $A_1$-$D_1$, but the event $C_4$ lacks account holder identity data. The temporal matching module 606 may scan other records within increasing series of time windows and recognize that event $C_4$ completes the series with events $A_4$, $B_4$, and $D_4$ to satisfy the known temporal attribute. The temporal matching module 606 may therefore add the record for event $C_4$ with a bucket for the account holder associated with events $A_4$, $B_4$, and $D_4$ to indicate that account holder as a possible account holder associated with the event $C_4$.

Figure 8:
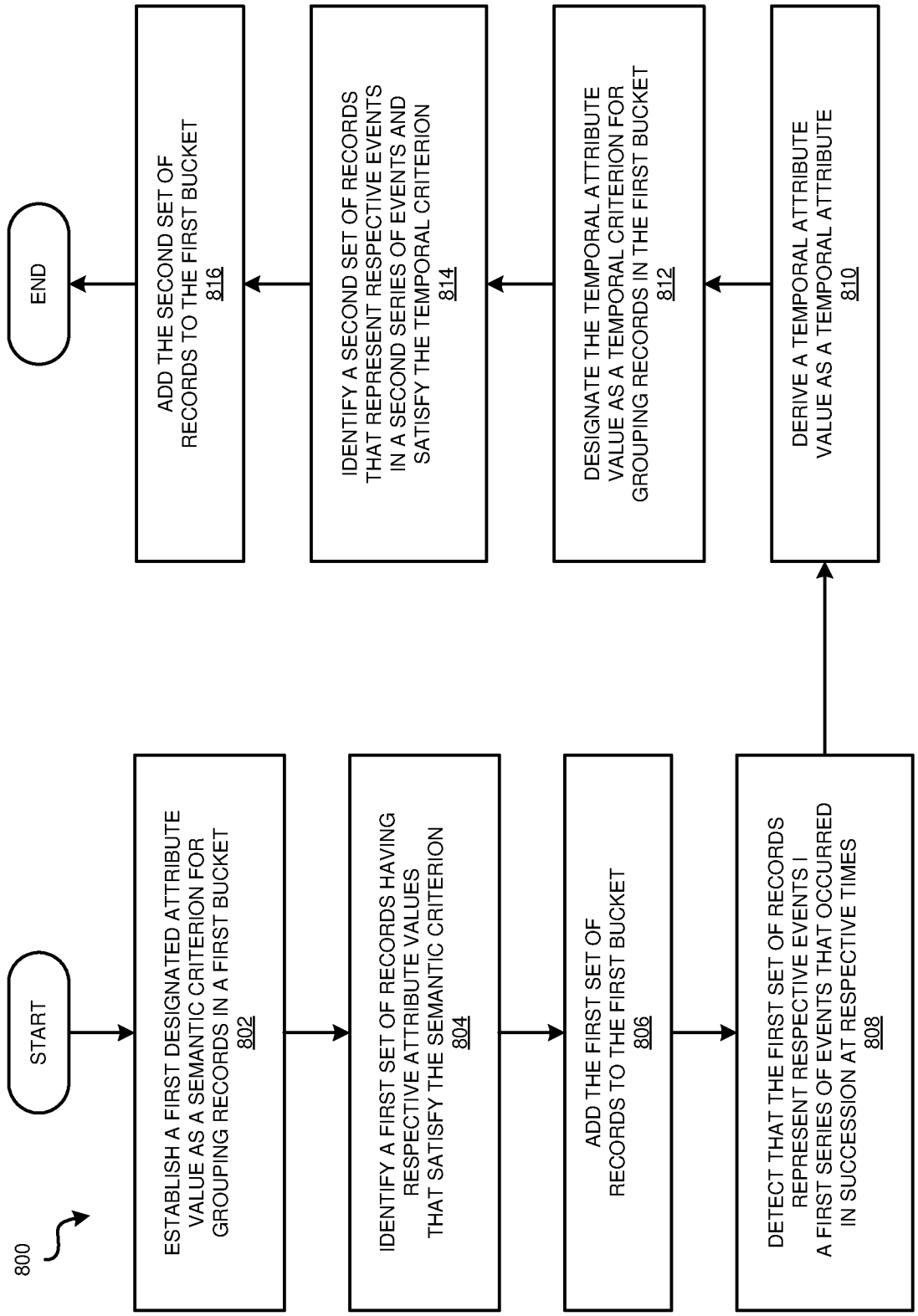
FIG. 8 depicts a flowchart of an example process which uses temporal point processes for bucketing records in accordance with an illustrative embodiment.

With reference to FIG. 8, this figure depicts a flowchart of an example process 800 which uses temporal point processes for bucketing records in accordance with an illustrative embodiment. In a particular embodiment, the MDM system 400 carries out the process 800.

In an embodiment, the process is a data matching process for optimizing searches, additions, and updates to existing data in a database. In some embodiments, the process includes data standardization, bucketing, and comparison processes.

In some embodiments, at block 802, the process establishes a first designated attribute value as a semantic criterion for grouping records in a first bucket. In some embodiments, the process uses standardized data for matching and linking processes, including bucketing of records. For example, in some embodiments, the process includes one or more of many known standardization techniques, such as converting textual data to all capital letters and stripping out non-print characters (e.g., carriage returns, line feeds, and tabs), checking for valid zip code or email values, generating phonetic metadata and/or performing nickname translation of incoming records.

Next, at block 804, the process identifies a first set of records having respective attribute values that satisfy the semantic criterion, and at block 806, the process adds the first set of records to the first bucket. In some embodiments, the process considers semantically-similar records to be records having more than a threshold degree of similarity between their respective identity attributes. In some embodiments, the process considers records having more than 50% identical identity attributes to be semantically-similar records. In an embodiment, the process considers records having more than 75% to be semantically-similar records. In some embodiments, the process uses other threshold levels to increase the number of semantically-similar records with a lower threshold, at the possible expense of incorrectly matched records. In some embodiments, the process uses a higher threshold level to decrease the likelihood of incorrectly matched records, at the possible expense of failing to match all records associated with a particular entity. In some embodiments, the process adjusts threshold values to increase or decrease the number of matching records returned.

Next, at block 808, the process detects that the first set of records represent respective events in a first series of events that occurred in succession at respective times. Next, at block 810, the process derives a temporal attribute value as a temporal attribute. In some embodiments, the temporal attribute value is representative of a time pattern formed by the respective times of the first series of events. In some embodiments, the temporal attribute models the time pattern as a temporal point process that includes a time-series of binary events that occur in continuous time. The temporal attribute may be based on either a series of times within the process window indicating when the events occur, or a series of waiting periods within the process window between the occurrences of events.

Next, at block 812, the process designates the temporal attribute value as a temporal criterion for grouping records in the first bucket. In some embodiments, the process performs temporal matching that includes modeling a process window as a series of evenly-spaced time intervals and generating an expression of a temporal attribute in terms of the number of binary events that occur in each interval. In some such embodiments, the temporal matching process sets the time intervals to be too small for any interval to include more than one event, which allows the temporal matching process to express a temporal attribute as a sequence of zeros and ones indicating which time intervals include an event and which do not.

Next, at block 814, the process identifies a second set of records that represent respective events in a second series of events and satisfy the temporal criterion. In some embodiments, the process uses temporal matching to group records that have similar temporal attributes into a bucket, where the temporal attributes are modeled as temporal point processes that describe respective patterns of similar events that occur according to similar time patterns. In some such embodiments, a temporal attribute may be derived from a series of transactions that an entity tends to repeat according to similar time patterns.

Finally, at block 816, the process adds the second set of records to the first bucket based at least in part on the identifying of the second set of records as satisfying the temporal criterion. In some embodiments, if the process identifies records of a second account that have a similar temporal attribute, the process may determine that this indicates that the second account belongs to the same entity as the first account. In some embodiments, if the identity information for the account holders of the first and second accounts do not match, the process may flag these accounts for review or identity verification. Thus, the process identifies accounts in which an account holder may have used fictional identity information when opening the account based on similar temporal attributes indicative of time patterns of the account holder's activities.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
identifying, from among a plurality of entity records in a central data repository, a first set of records having respective semantic attribute values that satisfy a first semantic criterion;
adding the first set of records to a first bucket;
detecting that the first set of records represent respective events in a first series of events that occurred in succession at respective times;
deriving a temporal attribute value as a temporal attribute, wherein the temporal attribute value is representative of a time pattern formed by the respective times of the first series of events;
designating the temporal attribute value as a temporal criterion for grouping records in the first bucket;
identifying a second set of records that represent respective events in a second series of events and satisfy the temporal criterion; and
adding the second set of records to the first bucket based at least in part on the identifying of the second set of records as satisfying the temporal criterion.

2. The method of claim 1, further comprising:
determining that respective semantic attribute values of each the second set of records fails to satisfy the first semantic criterion.

3. The method of claim 2, wherein the determining that the respective semantic attribute values of each of the second set of records fail fails to satisfy the first semantic criterion comprises:
comparing the respective semantic attribute values of each of the second set of records to the first semantic criterion for the first bucket, wherein the comparing results in respective similarity values for each of the second set of records; and
determining that the similarity values are less than a similarity threshold value, wherein similarity values that are less than the similarity threshold value are indicative of dissimilar semantic attribute values.

4. The method of claim 2, wherein the first semantic criterion is an identity attribute representative of identity information of an entity.

5. The method of claim 4, further comprising:
flagging the second set of records as potentially including fictional identity information based on the second set of records satisfying the temporal criterion and failing to satisfy the first semantic criterion.

6. The method of claim 4, further comprising:
providing, responsive to a query that includes search data representative of identity information of the entity, the records of the first bucket as candidate records.

7. The method of claim 1, further comprising:
establishing a second semantic criterion for grouping records in a second bucket, wherein the second semantic criterion is based on at least one of the semantic attribute values of the second set of records.

8. The method of claim 7, further comprising:
designating the temporal attribute value as a temporal criterion for grouping records in the second bucket.

9. The method of claim 1, further comprising:
receiving the second set of records in succession as streaming data as the respective events occur.

10. The method of claim 1, wherein the deriving of the temporal attribute value comprises modeling the time pattern formed by the respective times of the first series of events as a temporal point process resulting in a probability distribution over the time pattern.

11. The method of claim 10, wherein identifying that the second set of records satisfy the temporal criterion comprises comparing times of the second series of events to the probability distribution.

12. The method of claim 1, wherein the detecting that the first set of records represent respective events that occurred in succession at respective times is based at least in part on timestamp data associated with at least one of the first set of records.

13. A computer program product, the computer program product comprising one or more computer readable storage media, and program instructions collectively stored on the one or more computer readable storage media, the program instructions executable by one or more processors to cause the one or more processors to perform operations comprising:
identifying, from among a plurality of entity records in a central data repository, a first set of records having respective semantic attribute values that satisfy a first semantic criterion;
adding the first set of records to a first bucket;
detecting that the first set of records represent respective events in a first series of events that occurred in succession at respective times;
deriving a temporal attribute value as a temporal attribute, wherein the temporal attribute value is representative of a time pattern formed by the respective times of the first series of events;
designating the temporal attribute value as a temporal criterion for grouping records in the first bucket;
identifying a second set of records that represent respective events in a second series of events and satisfy the temporal criterion; and
adding the second set of records to the first bucket based at least in part on the identifying of the second set of records as satisfying the temporal criterion.

14. The computer program product of claim 13, wherein the stored program instructions are stored in a computer readable storage device in a data processing system, and wherein the stored program instructions are transferred over a network from a remote data processing system.

15. The computer program product of claim 13, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

16. The computer program product of claim 13, wherein the deriving of the temporal attribute value comprises modeling the time pattern formed by the respective times of the first series of events as a temporal point process resulting in a probability distribution over the time pattern.

17. The computer program product of claim 16, wherein identifying that the second set of records satisfy the temporal criterion comprises comparing times of the second series of events to the probability distribution.

18. A computer system comprising one or more processors and one or more computer readable storage media, and program instructions collectively stored on the one or more computer readable storage media, the program instructions executable by the one or more processors to cause the one or more processors to perform operations comprising:
identifying, from among a plurality of entity records in a central data repository, a first set of records having respective semantic attribute values that satisfy a first semantic criterion;
adding the first set of records to a first bucket;
detecting that the first set of records represent respective events in a first series of events that occurred in succession at respective times;
deriving a temporal attribute value as a temporal attribute, wherein the temporal attribute value is representative of a time pattern formed by the respective times of the first series of events;
designating the temporal attribute value as a temporal criterion for grouping records in the first bucket;
identifying a second set of records that represent respective events in a second series of events and satisfy the temporal criterion; and
adding the second set of records to the first bucket based at least in part on the identifying of the second set of records as satisfying the temporal criterion.

19. The computer system of claim 18, wherein the deriving of the temporal attribute value comprises modeling the time pattern formed by the respective times of the first series of events as a temporal point process resulting in a probability distribution over the time pattern.

20. The computer system of claim 19, wherein identifying that the second set of records satisfy the temporal criterion comprises comparing times of the second series of events to the probability distribution.

* * * * *